US00RE42714E

(19) United States
(12) Reissued Patent
DeLaine, Jr.

(10) Patent Number: US RE42,714 E
(45) Date of Reissued Patent: Sep. 20, 2011

(54) APPARATUS FOR VOICE COMMUNICATIONS OVER WIRED AND WIRELESS NETWORKS

(76) Inventor: Phillip M. DeLaine, Jr., Tyngsboro, MA (US)

(21) Appl. No.: 10/962,388

(22) Filed: Oct. 8, 2004

Related U.S. Patent Documents

Reissue of:
(64) Patent No.: 6,778,662
Issued: Aug. 17, 2004
Appl. No.: 09/557,113
Filed: Apr. 24, 2000

U.S. Applications:
(60) Provisional application No. 60/130,545, filed on Apr. 22, 1999.

(51) Int. Cl.
*H04M 7/00* (2006.01)

(52) U.S. Cl. ..... 379/333; 379/399.01; 379/93.09

(58) Field of Classification Search ..... 379/333, 379/399, 93.05, 93.09; 370/352
See application file for complete search history.

(56) References Cited

U.S. PATENT DOCUMENTS

| | | | | | |
|---|---|---|---|---|---|
| 5,515,375 | A * | 5/1996 | DeClerck | 370/468 |
| 5,838,720 | A * | 11/1998 | Morelli | 375/219 |
| 5,889,856 | A * | 3/1999 | O'Toole et al. | 379/399 |
| 6,144,734 | A * | 11/2000 | Beeman | 379/398 |
| 6,144,735 | A * | 11/2000 | Bella | 379/399 |
| 6,236,365 | B1 * | 5/2001 | LeBlanc et al. | 342/457 |
| 6,317,464 | B1 * | 11/2001 | Le et al. | 375/257 |
| 6,389,001 | B1 * | 5/2002 | Lee | 370/342 |
| 6,414,952 | B2 * | 7/2002 | Foley | 370/352 |
| 6,498,791 | B2 * | 12/2002 | Pickett et al. | 370/353 |

* cited by examiner

*Primary Examiner* — William J Deane
(74) *Attorney, Agent, or Firm* — Merchant & Gould

(57) ABSTRACT

Disclosed is a computer telephony device with a telephone line distribution system. The invention enables simultaneous operations of computer telephony and connected equipment. The connected equipment can be modems, telephones, fax machines, answering machines or any other device that needs access to a telephone line. Priorities for telephone line usage by the equipment or the routing of incoming calls to the equipment can be set by the user via software selection. The invention can work in digital and analog environments, and if necessary, perform digital-to-analog and analog-to-digital conversions.

114 Claims, 7 Drawing Sheets

Figure 6

Communication Line Identification and Access Codes

Line 1 (200)

Telephone #: (123) 456-7890 (201)

Account #: (202)

Access Code #: (203)

Line 2 (204)

Telephone #: (987) 654-3210 (205)

Account #: (206)

Access Code #: (207)

Line 3 (208)

Telephone #: (209)

Account #: 000123456789000 (210)

Access Code #: 54321 (211)

Line 4 (212)

Telephone #: (213)

Account #: 000000123456789 (214)

Access Code #: 12345 (215)

APPARATUS FOR VOICE COMMUNICATIONS OVER WIRED AND WIRELESS NETWORKS

Matter enclosed in heavy brackets [ ] appears in the original patent but forms no part of this reissue specification; matter printed in italics indicates the additions made by reissue.

RELATED APPLICATION

This application is based on, claims priority to and incorporates by reference a U.S. Provisional Application dated Apr. 22, 1999, entitled "Point Card", Provisional Patent Application No. 60/130,545 to Delaine.

BACKGROUND OF THE INVENTION

1. Field of the Invention

The invention herein is related to computers, and particularly to computer telephony.

2. Description of Related Art

Companies usually have several pieces of office equipment that are critical to their operations. This equipment includes telephones, fax machines, answering machines and computers with modems. A common requirement of this equipment is telephone lines. Companies usually connect each piece of equipment to a dedicated telephone line so that the equipment can operate independently and simultaneously. This configuration results in maximum flexibility and efficiency of company operations.

Many large companies have sophisticated telephone networks to support such office equipment. However, in the Small Office Home Office (SOHO) environment where the financial resources and the number of telephone lines are limited, connection of the equipment has often meant compromises in flexibility, utility and efficiency.

Many SOHO environments have 2 or 3 telephone lines available for use. Since the telephone system usually takes priority, 1 or 2 telephone lines are dedicated to it. This usually means that the rest of the office equipment shares a telephone line. To enable telephone line sharing, many businesses use a device called a "Fax Switch". An example of a Fax Switch is the Radio Shack Model AFX-400 Three-Device Home Fax Switch. This device has a facility to connect a telephone line to a telephone, a computer modem, a fax machine, and an answering machine. For incoming calls, this device analyzes the incoming call on the telephone line and automatically routes the call to the appropriate piece of equipment. For out going calls, this device provides the equipment with access to the telephone line. This device is beneficial because it allows all of the equipment to operate on a telephone line. The problem with this configuration is that when one piece of equipment is in use, the remaining equipment cannot be used. This lack of flexibility is often frustrating to many small businesses, especially when a business opportunity requires simultaneous operations. Some companies address the problem by changing the telephone line connections so that the desired operations can be performed. However, this process is cumbersome and often comes at the expense of other equipment operation.

The modem industry has attempted to provide a solution by integrating data, voice, fax and answering machine functions into a single device. However, the computer modem has disadvantages similar to the fax switch. The modem usually operates on one telephone line and is thus limited in the functions that it can perform simultaneously. Currently, with the proper telephone line service connected, the modem can simultaneously perform voice telephony and a data connection, to the Internet for example. This restriction could be resolved by the use of multiple modems, however, this solution has a redundancy and complexity of operation that is not practical for most small businesses. In addition, the computer modem offers little or no connectivity to other pieces of office equipment. The computer modem does provide some level of integration of equipment functions onto a telephone line, however its inability to perform the required office operations simultaneously indicates that it is not the optimum solution.

With no practical alternatives, many small companies continue to use telephones for voice communications and fax switches for their office equipment. What is needed is a device that provides multiple telephone line management and device connectivity such that office operations can be performed efficiently and simultaneously through the available telephone lines.

SUMMARY OF THE INVENTION

According to the principles of the invention, there is provided a computer telephony device with a telephone line distribution system. The invention enables simultaneous operations of computer telephony and connected equipment. The connected equipment can be modems, telephones, fax machines, answering machines or any other device that needs access to a telephone line. Priorities for telephone line usage by the equipment or the routing of incoming calls to the equipment can be set by the user via software selection. The invention can work in digital and analog environments, and if necessary, perform digital-to-analog and analog-to-digital conversions.

The invention herein is a computer telephone line distribution system. The invention enables simultaneous operations of computer telephony and connected equipment. The connected equipment can be modems, telephones, fax machines, answering machines or any other device that needs access to a telephone line. The invention can accommodate several telephone lines and pieces of equipment. Priorities for telephone line usage by the equipment or the routing of incoming calls to the equipment can be set via software.

The invention can take the form of a peripheral card that can be added to a computer [or] *on the* fly) *or* be built into and made an integral part of a computerized system.

BRIEF DESCRIPTION OF THE DRAWINGS

The foregoing and other objects and advantages of the invention will be appreciated more fully from the following further description thereof, with reference to the accompanying drawings, wherein:

FIG. 6 shows a communication line information setup screen according to the principles of the invention.

DETAILED DESCRIPTION OF THE PREFERRED EMBODIMENT

Figure 1:
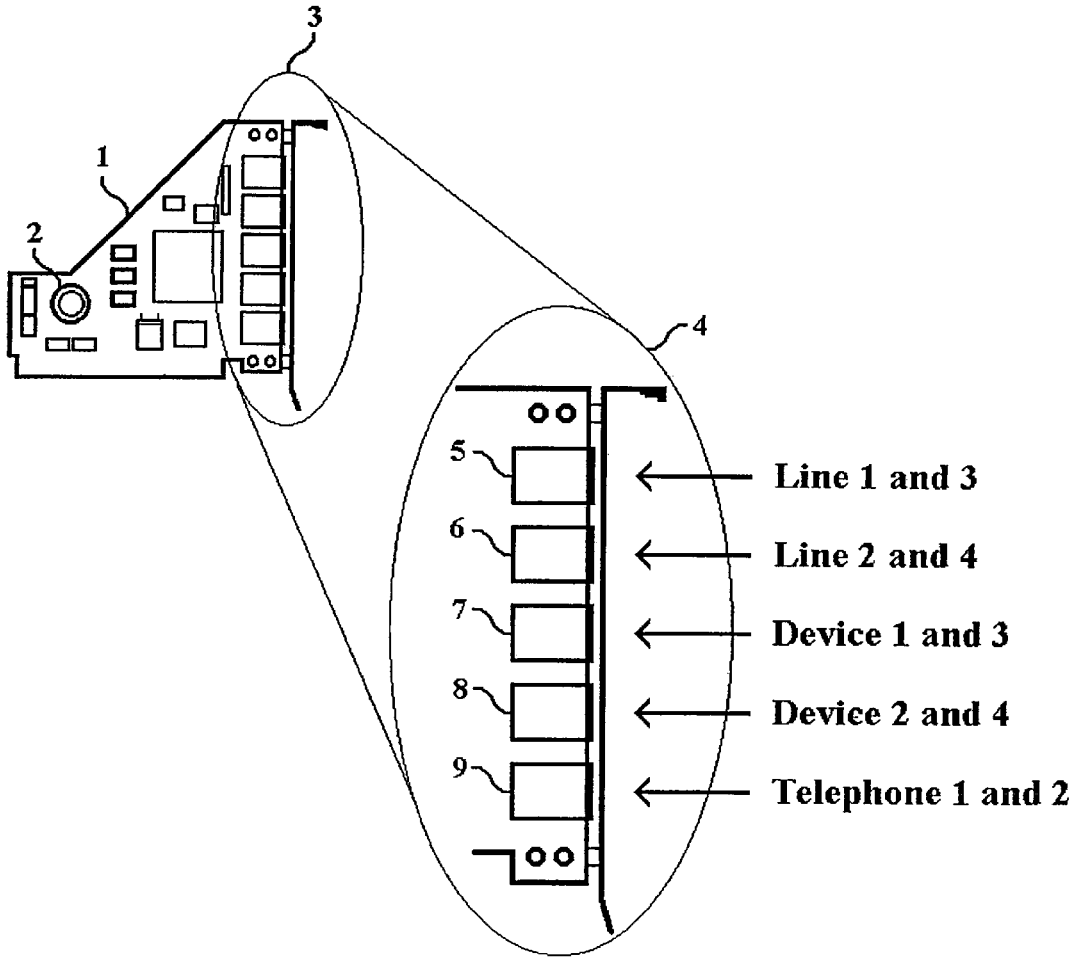
FIG. 1 shows a device according to the principles of the invention.

The invention herein provides a multi-function peripheral device that has connection facilities for telephone lines and equipment which uses telephone lines. FIG. 1 shows a computer card 1 according to the invention, with connection points 3 for external connections. Several connection points are shown in an exploded view 4 as connection points 5, 6, 7, 8, and 9. The connection points can receive RJ-11 type connectors, which is the standard for most telephone line accessing equipment.

In an embodiment of the invention, telephone lines may be connected to connection points 5 and 6, devices may be connected to connection points 7 and 8, and a telephone base may be connected to connection point 9. Each RJ-11 type connection provides four wire contacts. With the use of a Y-adapter, two pieces of equipment can connect at each connection point. Thus, in this embodiment, the invention may accommodate four telephone lines, four devices, and two telephone bases.

The invention can accept a variety of telephone lines. The telephone lines can carry analog or digital signals. The telephone lines can operate on a variety of networks including Public Switch Telephone Network (PSTN), Integrated Services Digital Network (ISDN), Symmetric Digital Subscriber Line (SDSL), Asymmetric Digital Subscriber Line (ADSL), or any other Digital Subscriber Line (xDSL). Optionally, the invention can accept a variety of other communication lines, including Private Branch Exchange (PBX), Analog and Digital (Hybrid), Cable, Fiber Optic, and Ethernet. Hereafter, unless otherwise specified, the communication lines and telephone lines that can connect to a connection point according to the invention will be generically referred to as "communication lines". As will be appreciated by those skilled in the art, a device according to the invention may be fitted with a suitable connector type to accommodate a desired communication line.

Figure 2:
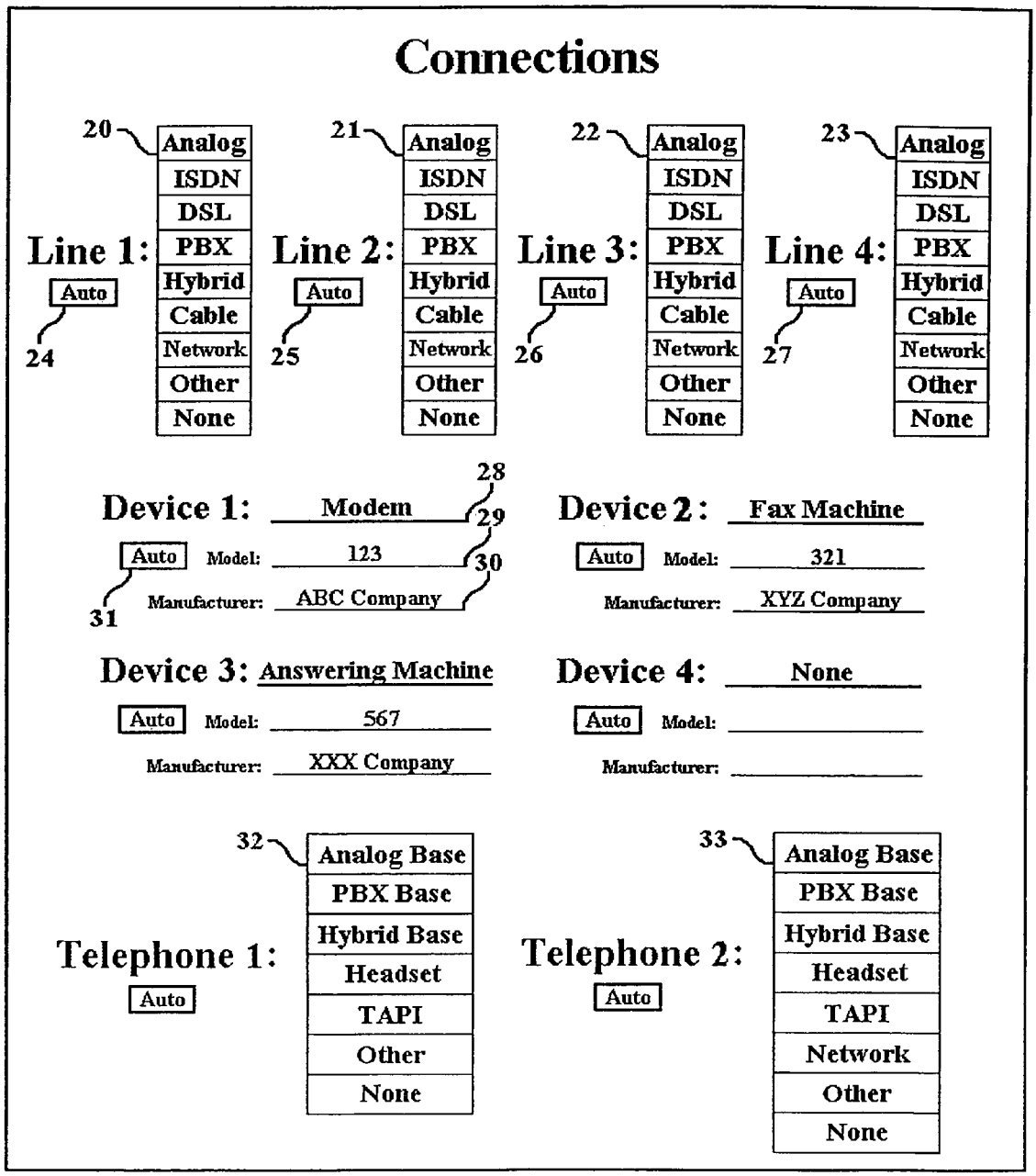
FIG. 2 shows a connection setup screen according to the principles of the invention.

The invention can be configured to the communication lines via software. FIG. 2 shows a software configuration screen for communication lines 1, 2, 3, and 4 which may be set by menus 20, 21, 22 and 23, respectively. Optionally, the user can activate an auto detection system for the communication lines via buttons 24, 25, 26 and 27, respectively.

A device according to the invention can accept connection of devices that can include telephones, fax machines, modems, answering machines, satellite dish control units, alarm systems, or any combination thereof, or any other device that requires access to a communication line. As shown in FIG. 2, each of these devices can be configured via software. For example, "Device 1" can be identified by entering a device type 28, a model 29, and a manufacturer 30. Optionally, the user can activate an auto detection system for the connected device via a button 31. Or, optionally, a device according to the invention can go into an auto detection mode as soon as the device is plugged in. In order to aid auto detection, an identification chip can be included in a connected device so that it can be identified more easily.

A device according to the invention can be fitted with circuitry to perform telephony operations. Telephony operational codes are specified by TAPI and the Hayes Computer AT Command Set. Additionally, U.S. Pat. No. 5,802,152 describes telephony circuits and controlling software. These technologies are well known to a person of reasonable knowledge and ordinary skill, so there will be little attempt to restate them here. The telephony audio signals can be made to pass through a computer's audio sound card, or through a connected telephone base. Optionally, a device according to the invention can be fitted with a camera so that video conferencing functions can be performed.

The setup screen in FIG. 2 can be used to configure the invention for operation on a PBX or Hybrid telephone system. The invention can have four methods for adapting to these various systems: 1) The invention can have a dedicated hardware design to operate on a limited number of systems; 2) The invention can poll the telephone system's control unit with the necessary signals to determine the telephone system; 3) The invention can be configured for a specific telephone system via software driver; or 4) The invention can be trained for use on a telephone system by the user picking up the telephone handset and pushing the buttons on telephone base as prompted by software according to the invention. Once properly configured, a system according to the invention can perform telephony and signal conversions for operation of connected devices. Manual selection of telephone operation may be provided in the setup screen, as shown by a "Telephone 1" menu 32, and a "Telephone 2" menu 33.

Figure 3:
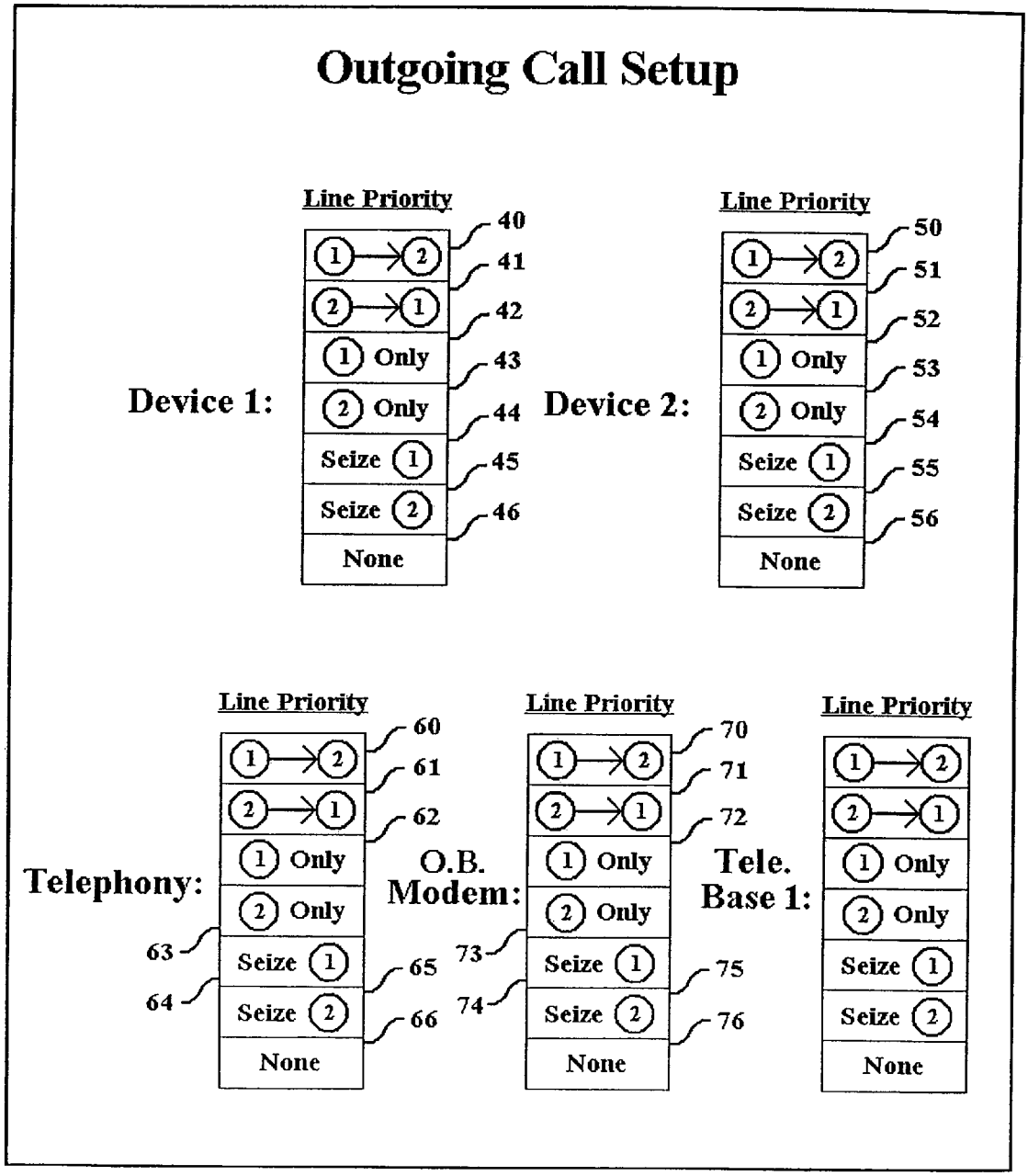
FIG. 3 shows an outgoing call setup screen according to the principles of the invention.

A device according to the invention processes outgoing calls in accordance with a Communication Line Use Priority (CLUP) setting. The CLUP establishes a priority in which communication lines are accessed by a device. FIG. 3 shows an outgoing call software setup screen and the options available for each device. The settings work in the following manner: If Device 1's CLUP is set for "1" to "2", as shown in a first line priority 40, and Device 1 requests a line, then a system according to the invention connects Device 1 communication line 1, if available. If line 1 is unavailable or is in use by another device, then a system according to the invention connects Device 1 to communication line 2, if available. If the line connection is unsuccessful, the invention can be set to repeat the CLUP sequence or stop after the first attempt. The menu options can include different line combinations, attempts for one line only, line seizing regardless of activity, and no line access.

In a second line priority 41, a line request by Device 1 will be connected to line 2 if available, and then to line 1, if available. In a third line priority 42, Device 1 will only be connected to line 1. In a fourth line priority 43, Device 1 will only be connected to line 2. In a fifth line priority 44, Device 1 will seize line 1, and line 1 will be withdrawn from availability for other devices until the CLUP for Device 1 is subsequently changed. In a sixth line priority 45, Device 1 will seize line 2, and line 2 will be withdrawn from availability for other devices until the CLUP for Device 1 is subsequently changed. In a seventh line priority 46, no line priority is provided for Device 1.

Line priority settings may be provided for other devices using the outgoing call setup screen. Thus line priorities may be assigned using Device 2 line priorities 50-56, Telephony line priorities 60-66, and Modem line priorities 70-76.

Figure 4:
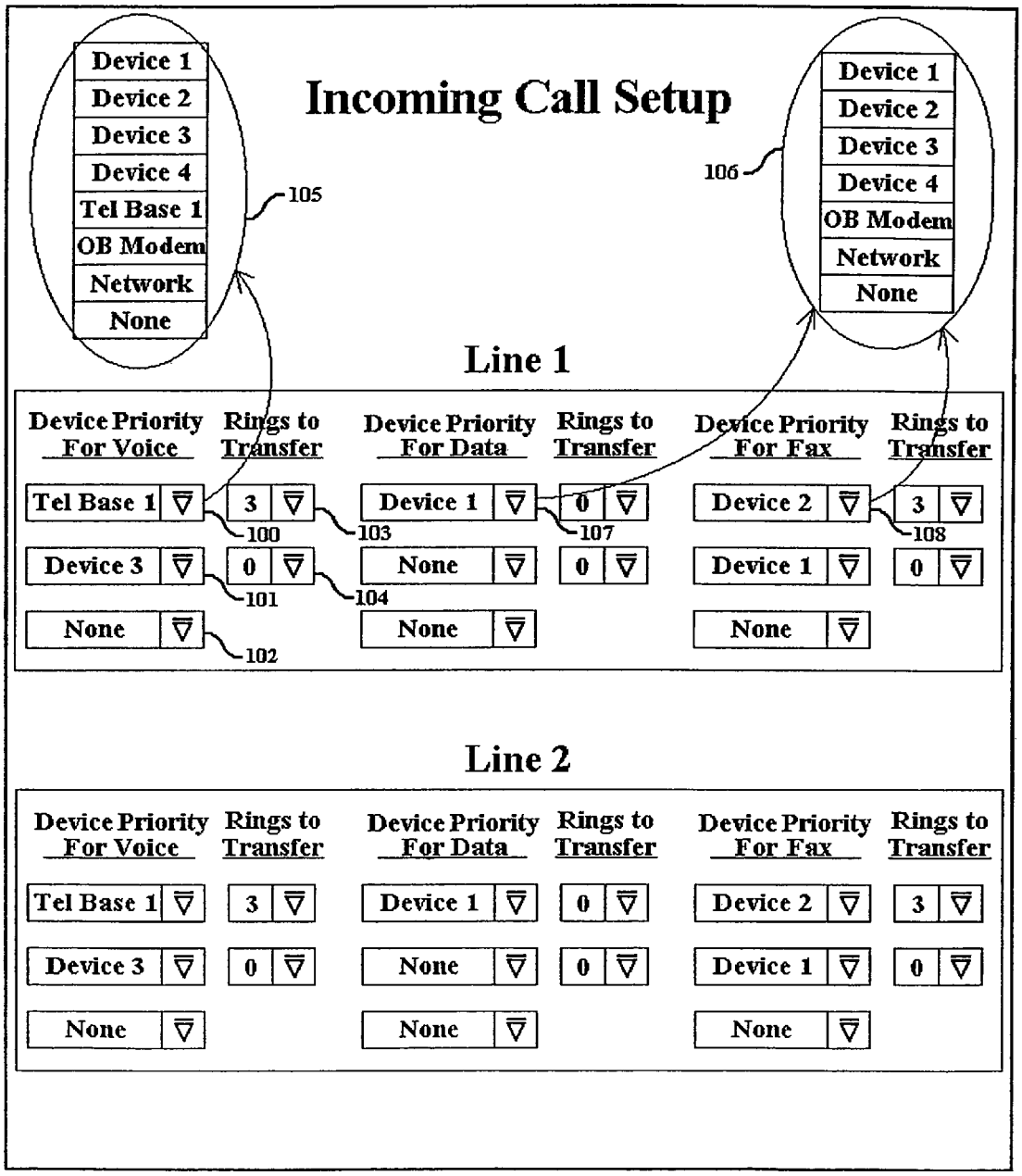
FIG. 4 shows an incoming call setup screen according to the principles of the invention.

A system according to the invention may process incoming calls in accordance with a Device Order (DO) setting. The DO establishes the order in which the devices are signaled by a communications line. FIG. 4 shows an incoming call software setup screen and the options that may be provided for each line. The settings work in the following manner: The device listed on top is the device that is rung first. The device listed below the first is rung second, and so forth. Therefore, if Line 1's DO is set for "Tel Base 1" 100 and "Device 3" 101 and the Ring to Transfer (RTT) is set for "3" 103 and "0" 104, respectively, and a call comes in on Line 1, a system according to the invention will connect Line 1 to Tel Base 1, if available, for 3 rings. If Tel Base 1 is in use or did not respond by the third ring, the invention will connect Line 1 to Device 3 for the remaining rings. The devices available for a connection are shown in a selection box 105. Note that when the RTT is set to "0", rings will not transfer to another device. Thus, a selection area 102 for a third device shows "None."

Optionally, the invention can be fitted with a discrimination circuit that can detect the type of call and automatically route the communication line to the corresponding DO. In an embodiment of the invention, a system may handle three types of calls: voice, data and facsimile ("fax"). DO for a data call is shown in a selection area 107, and DO for a fax call is shown in a selection area 108. In an embodiment of the invention, the same devices may be available to handle the above incoming call that are available for a voice call, as shown in a device list 106. A system according to the invention may be fitted with ring simulation circuitry that probes the devices in the DO after the type of call is detected.

The efficiency and flexibility of the invention is dependent on the number of communication lines connected to it. If four standard PSTN lines are connected to the invention, then four connected devices can operate simultaneously. If the number of PSTN lines drops to two, then only two operations can be conducted simultaneously. It should be noted that even with two communication lines the invention still improves line utilization due to the CLUP and DO settings. However, more communication lines provide better efficiency and flexibility. In one embodiment of the invention, digital communication lines may be used, such as DSL or ADSL. Such a digital line can provide several logical communication channels through one physical line.

Communications over a digital line may require the transmission of account numbers and passwords in order to access telecommunication services and other services. FIG. 6 shows a communication line information setup screen according to the invention. For each line available, information specific to that line may be provided. A line identifier is provided, such as "Line 1" 200, "Line 2" 204, "Line 3" 208, and "Line 4" 212. More or less lines may be listed, according to the number of lines available to the system, or the line capacity of the device. As shown for "Line 1" 200, a telephone number 201 is provided. A field for an account number 202 and an access code 203 are also provided, however, as shown in FIG. 6, no such information is included for Line 1. Line 2 also has fields for a telephone number 205, an account number 206, and an access code 207. Line 3 may be a digital line which does not have a telephone number, as seen in a telephone number field 209, but Line 3 does include an account number 210 and an access code 211. Line 4 similarly has fields for a telephone number 213, and account number 214, and an access code 215. As shown in FIG. 6, Line 4 also has an account number and an access code, but no telephone number.

A device according to the invention may include circuitry to perform analog-to-digital and digital-to-analog signal processing as needed. Such signal conversions may be used to allow a PSTN (analog) compatible device to operate over a digital communications line. For example, such signal conversions would permit a PSTN-compatible fax machine to communicate over a digital ISDN line. The setup shown in FIG. 2 may be used to specify appropriate signal conversions for the connected devices and communication lines.

A device according to the invention can be fitted with modem like circuitry to provide the user with access to the Internet. This modem function is identified in FIGS. 3 and 4 as "OB Modem" (On Board Modem). Some modems process analog signals. A modem according to the principles of the invention will be able to process analog or digital signals. A device according to the invention may include a socket so that a communications chip can be upgraded as necessary. Additionally, a device according to the invention can be provided with flash memory hardware so that upgrades can be performed via software or the Internet. Optionally, the invention can perform fax modem functions.

Figure 7:
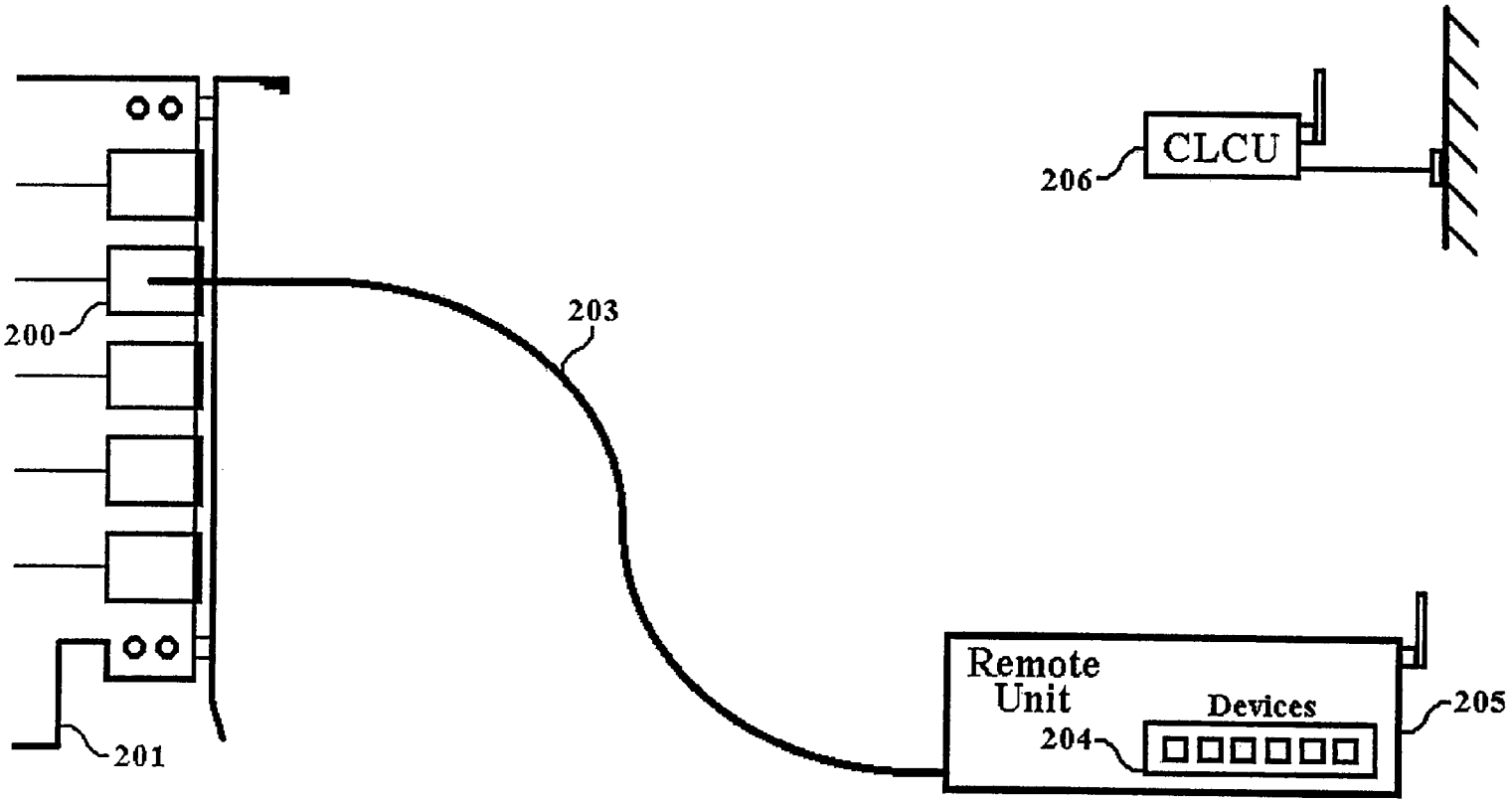
FIG. 7 shows a remote unit according to the principles of the invention.

FIG. 7 shows a device 201 according to the invention fitted with a Remote Unit (RU) 205 to enable wireless or cellular communications. For wireless communications, the RU 205 communicates with the Communication Line Control Unit (CLCU) 206 via digital, signals through the air. The CLCU 206 is connected to digital or analog communication lines in a physically convenient location. For cellular communications, the RU 205 communicates through the air to a cellular network. The wireless and cellular configurations provide the invention with communication lines that are wire free and allow the user to relocate the computer system and other office equipment (the connected devices) without having to rewire the communication lines. Optionally, the RU can provide additional space to connect more devices 204. Optionally, the RU can connect to the peripheral card 201 via a connection 203, such as a Universal Serial Bus (USB) connection, with a connection point 200 physically adapted to the connection 203. Optionally, the RU can be made as an internal device or manufactured onto the peripheral card 201.

The benefits of the wireless configuration can be greatly expanded by the integration of a wireless phone system into the RU. The communication lines used by the wireless phones can be controlled by the CLUP and DO. This configuration provides the office environment with the best efficiency and flexibility of operations.

Figure 5:
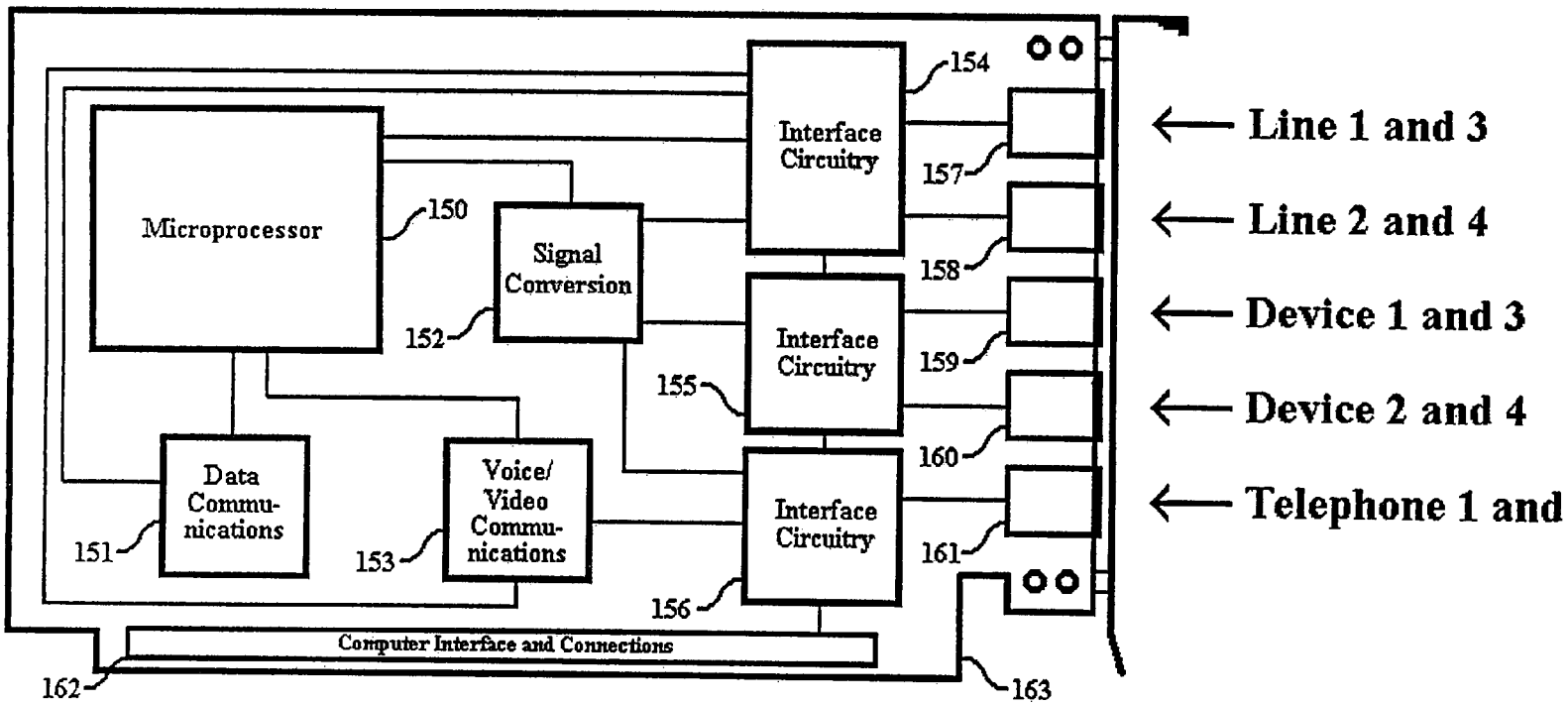
FIG. 5 shows a peripheral card according to the principles of the invention.

A device according to the invention can be controlled by an on board microprocessor or the microprocessor of the host machine. FIG. 5 shows a peripheral card 163 with an on board microprocessor 150 and interface circuitry 154, 155, and 156, a signal conversion system 152, voice/video communications circuitry 153, and data communications circuitry 151, which may operate to provide the functions described herein. The invention is shown on a peripheral card 163 that includes a computer interface and connection 162, which may be adapated to a computer bus such as an ISA, EISA, PCI, or other bus or connection type. A device according to the invention may also be configured as an external peripheral device connected to the computer via a serial or parallel port, universal serial bus (USB), or other connection.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

[1. An apparatus for routing digital and analog data signals call traffic among a plurality of telecommunication devices over a network comprising:

a network interface for connection to a local area network;

a discrimination circuit for detecting and identifying an input data signal, wherein the input data signal is at least one of an analog signal and a digital signal;

a wireless interface, connected to the discrimination circuit, wherein the wireless interface communicates both digital and analog data signals plurality of wireless telecommunication devices; and a plurality of telephony interfaces, connected to the discrimination circuit, for connecting a plurality of wireline telecommunication devices, wherein each of the plurality of telephony interfaces communicates both digital and analog data signals between the plurality of wireline telecommunication devices, wherein the apparatus routes the digital and analog data signals between the network interface and the telephony and wireless interfaces for communication over the local area network.]

[2. The apparatus of claim 1, wherein the plurality of telephony interfaces comprise a plurality of jacks for connecting the plurality of wireline telecommunications devices.]

[3. The apparatus of claim 2, wherein the plurality of wireline telecommunications devices comprise a plurality of PSTN compatible devices.]

[4. The apparatus of claim 3, wherein the plurality of PSTN compatible devices comprise a telephone.]

[5. The apparatus of claim 1, wherein the plurality of wireless telecommunication devices include wireless telephones.]

[6. The apparatus of claim 1, further comprising an analog-to-digital conversion circuit and a digital-to-analog conversion circuit for enabling the wireline and wireless telecommunications devices to communicate the digital and analog data signals over the local area network.]

[7. The apparatus of claim 1, wherein the local area network is an Ethernet network.]

[8. The apparatus of claim 1 further comprising a modem circuit for communicating over the Internet through the network interface.]

[9. The apparatus of claim 1, wherein the call traffic comprises voice traffic and the apparatus further comprises a telephony circuit for communicating the analog data signals voice traffic through the network interface.]

[10. The apparatus of claim 1 further comprising a fax circuit for communicating the analog data signals call traffic through the network interface.]

[11. The apparatus of claim 1, wherein the wireless interface is an antenna for sending and receiving the analog and digital data signals call traffic from the wireless telecommunications devices.]

[12. The apparatus of claim 1 further comprising interface connections for electrically connecting the apparatus to a computer bus in a computer system.]

[13. The apparatus of claim 1 further comprising an upgradeable memory device.]

[14. The apparatus of claim 13, wherein the upgradeable memory device is upgradeable using software.]

[15. The apparatus of claim 1, wherein the network interface communicates with a PBX system.]

[16. A system for routing analog and digital data signals call traffic among a plurality of telecommunication devices over a cellular network comprising:

a switch comprising:

a discrimination circuit for detecting and identifying an input data signal, wherein the input data signal is at least one of an analog signal and a digital signal;

an antenna, for communicating with a plurality of cellular telecommunication devices over the cellular network, wherein the antenna communicates analog and digital data signals through the cellular telecommunication devices;

a wireless interface, connected to the discrimination circuit, wherein the wireless interface communicates both digital and analog data signals between plurality of wireless telecommunication devices; and a plurality of telephony interfaces, connected to the discrimination circuit, for connecting a plurality of wireline telecommunication devices, wherein each of the plurality of telephony interfaces communicates both digital and analog data signals between the plurality of wireline telecommunication devices, wherein the switch routes the digital and analog data signals call traffic between the antenna and the wireless and telephony interfaces.]

[17. The system of claim 16, wherein the switch is a peripheral card for use in a computer system.]

[18. The system of claim 16, wherein the antenna is mounted to a remote unit that is physically separate from the switch and is electrically connected to the switch by a wire line.]

[19. The system of claim 16, wherein the plurality of wireless communication devices include wireless telephones.]

[20. The system of claim 16, wherein the plurality of telephony interfaces are compatible with a PSTN network.]

[21. The system of claim 16, wherein the plurality of telephony interfaces are compatible with digital telephone lines.]

[22. A system for routing analog and digital data signals among a plurality of telecommunication devices over wirelines comprising:

a switch comprising:

a discrimination circuit for detecting and identifying an input data signal, wherein the input data signal is at least one of an analog signal and a digital signal;

a first plurality of telephony interfaces, connected to the discrimination circuit, for connecting a plurality of wireline telecommunication devices, wherein each of the plurality of telephony interfaces communicates both digital and analog data signals between the plurality of wireline telecommunication devices; and a wireless interface, connected to the discrimination circuit, wherein the wireless interface communicates both digital and analog data signals between plurality of wireless telecommunication devices;

a first remote unit, in electrical communication with the switch, wherein the first remote unit includes an antenna for wireless communication; and a second remote unit, in wireless communication with the first remote unit through the antenna, wherein the second remote unit includes a second plurality of telephony interfaces for connecting at least one communication line, and wherein the second remote unit communicates both digital and analog data signals between the switch and the communication line, through the first remote unit, wherein the switch routes the digital and analog data signals from the first plurality of wireline telecommunication devices and the wireless telecommunication devices to the at least one communication line, and wherein the switch is a peripheral card electrically connected to a computer bus in a computer system.]

[23. The system of claim 22, wherein the plurality of wireless communication devices include wireless telephones.]

[24. The system of claim 22, wherein the first and second plurality of telephony interfaces are compatible with a PSTN network.]

[25. The system of claim 22, wherein the at least one communication line is a digital telephone line.]

*26. An apparatus for routing digital data signals among a plurality of telecommunications devices over a network, the apparatus comprising:*

*a network interface for connection to at least one network communication line, wherein the network interface receives digital data signals over the at least one network communication line, the digital data signals comprising at least one voice signal;*

*a discrimination circuit connected to the network interface for detecting incoming voice signals from among other digital data signals;*

*a wireless interface, wherein the wireless interface communicates the digital data signals between a plurality of wireless telecommunications devices; and*

*a processor for executing instructions to route the digital data signals between the network interface, the wireless interface, and the plurality of wireless telecommunications devices for communication over the network, wherein the processor is further operative to execute instructions to:*

*process a plurality of digital communication sessions; and*

*distinguish each of the plurality of digital communication sessions using data transmission codes.*

*27. The apparatus of claim 26, wherein the plurality of wireless telecommunications devices comprise at least one telephone handset.*

*28. The apparatus of claim 26 further comprising a circuit for routing voice communication sessions to specific telecommunications devices.*

*29. The apparatus of claim 26 further comprising configuration software which configures routing of voice communication sessions to the plurality of telecommunications devices.*

*30. The apparatus of claim 26, wherein the at least one network communication line is part of an Ethernet network.*

*31. The apparatus of claim 26, wherein the at least one network communication line is part of a local area network.*

*32. The apparatus of claim 26, wherein the at least one network communication line is part of a Cable network.*

*33. The apparatus of claim 26, wherein the at least one network communication line is part of a digital subscriber line network.*

*34. The apparatus of claim 26, wherein the at least one network communication line is part of a fiber optic network.*

*35. An apparatus for routing digital data signals among a plurality of telecommunications devices over a network, the apparatus comprising:*

*a network interface for connection to at least one network communication line, wherein the network interface receives digital data signals over the at least one network communication line, the digital data signals comprising at least one voice signal;*

*a discrimination circuit connected to the network interface for detecting incoming voice signals from among other digital data signals;*

*a wireless interface, wherein the wireless interface communicates the digital data signals between a plurality of wireless telecommunications devices; and*

*a processor for executing instructions to route the digital data signals between the network interface, the wireless interface, and the plurality of wireless telecommunications devices for communication over the network; and*

*a circuit for routing voice communication sessions to specific telecommunications devices.*

*36. The apparatus of claim 35, wherein the processor is further operative to execute instructions to:*

*process a plurality of digital communication sessions; and*

*distinguish each of the plurality of digital communication sessions using data transmission codes.*

*37. The apparatus of claim 35 further comprising configuration software which configures routing of voice communication sessions to the plurality of telecommunications devices.*

*38. The apparatus of claim 35, wherein the at least one network communication line is part of an Ethernet network.*

*39. The apparatus of claim 35, wherein the at least one network communication line is part of a local area network.*

*40. The apparatus of claim 35, wherein the at least one network communication line is part of a Cable network.*

*41. The apparatus of claim 35, wherein the at least one network communication line is part of a digital subscriber line network.*

*42. The apparatus of claim 35, wherein the at least one network communication line is part of a fiber optic network.*

*43. The apparatus of claim 35, wherein the plurality of wireless telecommunications devices comprise at least one telephone handset.*

*44. An apparatus for routing digital data signals among a plurality of telecommunications devices over a network, the apparatus comprising:*

*a network interface for connection to at least one network communication line, wherein the network interface receives digital data signals over the at least one network communication line, the digital data signals comprising at least one voice signal;*

*a discrimination circuit connected to the network interface for detecting incoming voice signals from among other digital data signals;*

*a wireless interface, wherein the wireless interface communicates the digital data signals between a plurality of wireless telecommunications devices; and*

*a processor for executing instructions to route the digital data signals between the network interface, the wireless interface, and the plurality of wireless telecommunications devices for communication over the network; and*

*configuration software which configures routing of voice communication sessions to the plurality of telecommunications devices.*

*45. The apparatus of claim 44, wherein the processor is further operative to execute instructions to:*

*process a plurality of digital communication sessions; and*

*distinguish each of the plurality of digital communication sessions using data transmission codes.*

*46. The apparatus of claim 45 further comprising a circuit for routing voice communication sessions to specific telecommunications devices.*

*47. The apparatus of claim 45, wherein the at least one network communication line is part of an Ethernet network.*

*48. The apparatus of claim 45, wherein the at least one network communication line is part of a local area network.*

*49. The apparatus of claim 45, wherein the at least one network communication line is part of a Cable network.*

*50. The apparatus of claim 45, wherein the at least one network communication line is part of a digital subscriber line network.*

*51. The apparatus of claim 45, wherein the at least one network communication line is part of a fiber optic network.*

*52. The apparatus of claim 45, wherein the plurality of wireless telecommunications devices comprise at least one telephone handset.*

*53. An apparatus for routing digital data signals among a plurality of telecommunications devices over a network, the apparatus comprising:*

*a network interface for connection to at least one network communication line, wherein the network interface receives digital data signals over the at least one network communication line, the digital data signals comprising at least one voice signal, wherein the at least one network communication line is part of an Ethernet network;*

*a discrimination circuit connected to the network interface for detecting incoming voice signals from among other digital data signals;*

*a wireless interface, wherein the wireless interface communicates the digital data signals between a plurality of wireless telecommunications devices; and*

*a processor for executing instructions to route the digital data signals between the network interface, the wireless interface, and the plurality of wireless telecommunications devices for communication over the network.*

*54. The apparatus of claim 53, wherein the processor is further operative to execute instructions to:*

*process a plurality of digital communication sessions; and*

*distinguish each of the plurality of digital communication sessions using data transmission codes.*

*55. The apparatus of claim 53 further comprising a circuit for routing voice communication sessions to specific telecommunications devices.*

*56. The apparatus of claim 53 further comprising configuration software which configures routing of voice communication sessions to the plurality of telecommunications devices.*

*57. The apparatus of claim 53, wherein the plurality of wireless telecommunications devices comprise at least one telephone handset.*

*58. The apparatus of claim 46, wherein the processor is further operative to execute instructions to:*

*process a plurality of digital communication sessions; and*

*distinguish each of the plurality of digital communication sessions using data transmission codes.*

*59. The apparatus of claim 46 further comprising a circuit for routing voice communication sessions to specific telecommunications devices.*

*60. The apparatus of claim 46 further comprising configuration software which configures routing of voice communication sessions to the plurality of telecommunications devices.*

*61. The apparatus of claim 46, wherein the plurality of wireless telecommunications devices comprise at least one telephone handset.*

*62. An apparatus for routing digital data signals among a plurality of telecommunications devices over a network, the apparatus comprising:*

*a network interface for connection to at least one network communication line, wherein the network interface receives digital data signals over the at least one network communication line, the digital data signals comprising at least one voice signal, wherein the at least one network communication line is part of a Cable network;*

*a discrimination circuit connected to the network interface for detecting incoming voice signals from among other digital data signals;*

*a wireless interface, wherein the wireless interface communicates the digital data signals between a plurality of wireless telecommunications devices; and*

*a processor for executing instructions to route the digital data signals between the network interface, the wireless interface, and the plurality of wireless telecommunications devices for communication over the network.*

*63. The apparatus of claim 62, wherein the processor is further operative to execute instructions to:*

*process a plurality of digital communication sessions; and*

*distinguish each of the plurality of digital communication sessions using data transmission codes.*

*64. The apparatus of claim 62 further comprising a circuit for routing voice communication sessions to specific telecommunications devices.*

*65. The apparatus of claim 62 further comprising configuration software which configures routing of voice communication sessions to the plurality of telecommunications devices.*

*66. The apparatus of claim 62, wherein the plurality of wireless telecommunications devices comprise at least one telephone handset.*

*67. An apparatus for routing digital data signals among a plurality of telecommunications devices over a network, the apparatus comprising:*

*a network interface for connection to at least one network communication line, wherein the network interface receives digital data signals over the at least one network communication line, the digital data signals comprising at least one voice signal, wherein the at least one network communication line is part of a digital subscriber line network;*

*a discrimination circuit connected to the network interface for detecting incoming voice signals from among other digital data signals;*

*a wireless interface, wherein the wireless interface communicates the digital data signals between a plurality of wireless telecommunications devices; and*

*a processor for executing instructions to route the digital data signals between the network interface, the wireless interface, and the plurality of wireless telecommunications devices for communication over the network.*

*68. The apparatus of claim 67, wherein the processor is further operative to execute instructions to:*

*process a plurality of digital communication sessions; and*

*distinguish each of the plurality of digital communication sessions using data transmission codes.*

*69. The apparatus of claim 67 further comprising a circuit for routing voice communication sessions to specific telecommunications devices.*

*70. The apparatus of claim 67 further comprising configuration software which configures routing of voice communication sessions to the plurality of telecommunications devices.*

*71. The apparatus of claim 67, wherein the plurality of wireless telecommunications devices comprise at least one telephone handset.*

*72. An apparatus for routing digital data signals among a plurality of telecommunications devices over a network, the apparatus comprising:*

*a network interface for connection to at least one network communication line, wherein the network interface receives digital data signals over the at least one network communication line, the digital data signals comprising at least one voice signal, wherein the at least one network communication line is part of a fiber optic network;*

*a discrimination circuit connected to the network interface for detecting incoming voice signals from among other digital data signals;*

*a wireless interface, wherein the wireless interface communicates the digital data signals between a plurality of wireless telecommunications devices; and*

*a processor for executing instructions to route the digital data signals between the network interface, the wireless interface, and the plurality of wireless telecommunications devices for communication over the network.*

*73. The apparatus of claim 72, wherein the processor is further operative to execute instructions to:*

*process a plurality of digital communication sessions; and*

*distinguish each of the plurality of digital communication sessions using data transmission codes.*

*74. The apparatus of claim 72 further comprising a circuit for routing voice communication sessions to specific telecommunications devices.*

*75. The apparatus of claim 72 further comprising configuration software which configures routing of voice communication sessions to the plurality of telecommunications devices.*

*76. The apparatus of claim 72, wherein the plurality of wireless telecommunications devices comprise at least one telephone handset.*

*77. An apparatus for routing digital data signals among a plurality of telecommunication devices over a first network and a second network, the apparatus comprising:*

*a first network interface for wireless communications with the first network;*

*a discrimination circuit connected to the first network interface for detecting incoming voice digital data transmissions from among other data transmissions;*

*a second network interface, wherein the second network interface communicates digital data signals between a plurality of wireless telecommunications devices over the second network; and*

*a processor for executing instructions for routing the digital data signals between the first network interface, the second network interface and the plurality of wireless telecommunications devices for communication over the first and second networks, wherein the processor is further operative to execute instructions to:*

*process a plurality of digital communication sessions; and*

*distinguish each of the plurality of digital communication sessions using data transmission codes.*

*78. The apparatus of claim 77 further comprising a circuit for routing voice communication sessions to specific telecommunications devices, wherein the specific telecommunications devices are specified by configuration software.*

*79. The apparatus of claim 77 further comprising configuration software which configures routing of voice communication sessions to the plurality of telecommunications devices.*

*80. The apparatus of claim 77, wherein the first network comprises a cellular network.*

*81. The apparatus of claim 77, wherein the plurality of wireless telecommunications devices comprise at least one telephone handset.*

*82. An apparatus for routing digital data signals among a plurality of telecommunication devices over a first network and a second network, the apparatus comprising:*

*a first network interface for wireless communications with the first network;*

*a discrimination circuit connected to the first network interface for detecting incoming voice digital data transmissions from among other data transmissions;*

*a second network interface, wherein the second network interface communicates digital data signals between a plurality of wireless telecommunications devices over the second network; and*

*a processor for executing instructions for routing the digital data signals between the first network interface, the second network interface and the plurality of wireless telecommunications devices for communication over the first and second networks; and*

*a circuit for routing voice communication sessions to specific telecommunications devices, wherein the specific telecommunications devices are specified by configuration software.*

*83. The apparatus of claim 82, wherein the processor is further operative to execute instructions to:*

*process a plurality of digital communication sessions; and*

*distinguish each of the plurality of digital communication sessions using data transmission codes.*

*84. The apparatus of claim 82 further comprising configuration software which configures routing of voice communication sessions to the plurality of telecommunications devices.*

*85. The apparatus of claim 82, wherein the first network comprises a cellular network.*

*86. The apparatus of claim 82, wherein the plurality of wireless telecommunications devices comprise at least one telephone handset.*

*87. An apparatus for routing digital data signals among a plurality of telecommunication devices over a first network and a second network, the apparatus comprising:*

*a first network interface for wireless communications with the first network;*

*a discrimination circuit connected to the first network interface for detecting incoming voice digital data transmissions from among other data transmissions;*

*a second network interface, wherein the second network interface communicates digital data signals between a plurality of wireless telecommunications devices over the second network; and*

*a processor for executing instructions for routing the digital data signals between the first network interface, the second network interface and the plurality of wireless telecommunications devices for communication over the first and second networks; and*

*configuration software which configures routing of voice communication sessions to the plurality of telecommunications devices.*

*88. The apparatus of claim 87, wherein the processor is further operative to execute instructions to:*

*process a plurality of digital communication sessions; and*

*distinguish each of the plurality of digital communication sessions using data transmission codes.*

*89. The apparatus of claim 87 further comprising a circuit for routing voice communication sessions to specific telecommunications devices, wherein the specific telecommunications devices are specified by configuration software.*

*90. The apparatus of claim 87, wherein the first network comprises a cellular network.*

*91. The apparatus of claim 87, wherein the plurality of wireless telecommunications devices comprise at least one telephone handset.*

*92. An apparatus for routing digital data signals among a plurality of telecommunications devices over a network, the apparatus comprising:*

*a first assembly comprising a processor;*

*a first wireless interface (RU) connected to the first assembly for communicating digital data signals;*

*a second assembly comprising a network interface for connecting a communication line, wherein the network interface receives the digital data signals from the network communication line;*

*a second wireless interface (CLCU) connected to the second assembly for communicating the digital data signals to the first wireless interface;*

*a discrimination circuit connected to at least one of the first assembly and the second assembly for detecting incoming voice digital data signals from among other data signals;*

*a third wireless interface connected to the first assembly for communicating the digital data signals between a plurality of wireless telecommunications devices, wherein the processor executes instructions for routing the digi-*

*tal data signals between the first wireless interface, the second wireless interface, the third wireless interface, and the plurality of wireless telecommunications devices for communications over the network; and*

*a circuit for routing voice communication sessions to specific telecommunications devices, wherein the specific telecommunications devices are specified by configuration software.*

*93. The apparatus of claim 92, wherein the processor is further operative to execute instructions to:*

*process a plurality of digital communication sessions; and*

*distinguish each of the plurality of digital communication sessions using data transmission codes.*

*94. The apparatus of claim 92 further comprising configuration software which configures routing of voice communication sessions to the plurality of telecommunications devices.*

*95. The apparatus of claim 92, wherein the network communication line is part of an Ethernet network.*

*96. The apparatus of claim 92, wherein the network communication line is part of a local area network.*

*97. The apparatus of claim 92, wherein the network communication line is part of a Cable network.*

*98. The apparatus of claim 92, wherein the network communication line is part of a digital subscriber line network.*

*99. The apparatus of claim 92, wherein the network communication line is part of a fiber optic network.*

*100. The apparatus of claim 92, wherein the plurality of wireless telecommunications devices comprise at least one telephone handset.*

*101. An apparatus for routing digital data signals among a plurality of telecommunications devices over a network, the apparatus comprising:*

*a first assembly comprising a processor;*

*a first wireless interface (RU) connected to the first assembly for communicating digital data signals;*

*a second assembly comprising a network interface for connecting a communication line, wherein the network interface receives the digital data signals from the network communication line;*

*a second wireless interface (CLCU) connected to the second assembly for communicating the digital data signals to the first wireless interface;*

*a discrimination circuit connected to at least one of the first assembly and the second assembly for detecting incoming voice digital data signals from among other data signals;*

*a third wireless interface connected to the first assembly for communicating the digital data signals between a plurality of wireless telecommunications devices, wherein the processor executes instructions for routing the digital data signals between the first wireless interface, the second wireless interface, the third wireless interface, and the plurality of wireless telecommunications devices for communications over the network; and*

*configuration software which configures routing of voice communication sessions to the plurality of telecommunications devices.*

*102. The apparatus of claim 101, wherein the processor is further operative to execute instructions to:*

*process a plurality of digital communication sessions; and*

*distinguish each of the plurality of digital communication sessions using data transmission codes.*

*103. The apparatus of claim 101 further comprising a circuit for routing voice communication sessions to specific telecommunications devices, wherein the specific telecommunications devices are specified by configuration software.*

*104. The apparatus of claim 101, wherein the network communication line is part of an Ethernet network.*

*105. The apparatus of claim 101, wherein the network communication line is part of a local area network.*

*106. The apparatus of claim 101, wherein the network communication line is part of a Cable network.*

*107. The apparatus of claim 101, wherein the network communication line is part of a digital subscriber line network.*

*108. The apparatus of claim 101, wherein the network communication line is part of a fiber optic network.*

*109. The apparatus of claim 101, wherein the plurality of wireless telecommunications devices comprise at least one telephone handset.*

*110. An apparatus for routing digital data signals among a plurality of telecommunications devices over a network, the apparatus comprising:*

*a first assembly comprising a processor;*

*a first wireless interface (RU) connected to the first assembly for communicating digital data signals;*

*a second assembly comprising a network interface for connecting a communication line, wherein the network interface receives the digital data signals from the network communication line, wherein the network communication line is part of an Ethernet network;*

*a second wireless interface (CLCU) connected to the second assembly for communicating the digital data signals to the first wireless interface;*

*a discrimination circuit connected to at least one of the first assembly and the second assembly for detecting incoming voice digital data signals from among other data signals;*

*a third wireless interface connected to the first assembly for communicating the digital data signals between a plurality of wireless telecommunications devices, wherein the processor executes instructions for routing the digital data signals between the first wireless interface, the second wireless interface, the third wireless interface, and the plurality of wireless telecommunications devices for communications over the network.*

*111. The apparatus of claim 110, wherein the processor is further operative to execute instructions to:*

*process a plurality of digital communication sessions; and*

*distinguish each of the plurality of digital communication sessions using data transmission codes.*

*112. The apparatus of claim 110 further comprising a circuit for routing voice communication sessions to specific telecommunications devices, wherein the specific telecommunications devices are specified by configuration software.*

*113. The apparatus of claim 110 further comprising configuration software which configures routing of voice communication sessions to the plurality of telecommunications devices.*

*114. The apparatus of claim 110, wherein the plurality of wireless telecommunications devices comprise at least one telephone handset.*

*115. An apparatus for routing digital data signals among a plurality of telecommunications devices over a network, the apparatus comprising:*

*a first assembly comprising a processor;*

*a first wireless interface (RU) connected to the first assembly for communicating digital data signals;*

*a second assembly comprising a network interface for connecting a communication line, wherein the network interface receives the digital data signals from the network communication line, wherein the network communication line is part of a local area network;*

*a second wireless interface (CLCU) connected to the second assembly for communicating the digital data signals to the first wireless interface;*

*a discrimination circuit connected to at least one of the first assembly and the second assembly for detecting incoming voice digital data signals from among other data signals;*

*a third wireless interface connected to the first assembly for communicating the digital data signals between a plurality of wireless telecommunications devices, wherein the processor executes instructions for routing the digital data signals between the first wireless interface, the second wireless interface, the third wireless interface, and the plurality of wireless telecommunications devices for communications over the network.*

*116. The apparatus of claim 115, wherein the processor is further operative to execute instructions to:*

*process a plurality of digital communication sessions; and*

*distinguish each of the plurality of digital communication sessions using data transmission codes.*

*117. The apparatus of claim 115 further comprising a circuit for routing voice communication sessions to specific telecommunications devices, wherein the specific telecommunications devices are specified by configuration software.*

*118. The apparatus of claim 115 further comprising configuration software which configures routing of voice communication sessions to the plurality of telecommunications devices.*

*119. The apparatus of claim 115, wherein the plurality of wireless telecommunications devices comprise at least one telephone handset.*

*120. An apparatus for routing digital data signals among a plurality of telecommunications devices over a network, the apparatus comprising:*

*a first assembly comprising a processor;*

*a first wireless interface (RU) connected to the first assembly for communicating digital data signals;*

*a second assembly comprising a network interface for connecting a communication line, wherein the network interface receives the digital data signals from the network communication line, wherein the network communication line is part of a Cable network;*

*a second wireless interface (CLCU) connected to the second assembly for communicating the digital data signals to the first wireless interface;*

*a discrimination circuit connected to at least one of the first assembly and the second assembly for detecting incoming voice digital data signals from among other data signals;*

*a third wireless interface connected to the first assembly for communicating the digital data signals between a plurality of wireless telecommunications devices, wherein the processor executes instructions for routing the digital data signals between the first wireless interface, the second wireless interface, the third wireless interface, and the plurality of wireless telecommunications devices for communications over the network.*

*121. An apparatus for routing digital data signals among a plurality of telecommunication devices over a first network and a second network, the apparatus comprising:*

*a first network interface for wireless communications with the first network;*

*a discrimination circuit connected to the first network interface for detecting incoming voice digital data transmissions from among other data transmissions;*

*a second network interface, wherein the second network interface communicates digital data signals between a plurality of wireless telecommunications devices over the second network; and*

*a processor for executing instructions for routing the digital data signals between the first network interface, the second network interface and the plurality of wireless telecommunications devices for communication over the first and second networks, wherein the first network comprises a cellular network.*

*122. The apparatus of claim 121, wherein the processor is further operative to execute instructions to:*

*process a plurality of digital communication sessions; and*

*distinguish each of the plurality of digital communication sessions using data transmission codes.*

*123. The apparatus of claim 121 further comprising a circuit for routing voice communication sessions to specific telecommunications devices, wherein the specific telecommunications devices are specified by configuration software.*

*124. The apparatus of claim 121 further comprising configuration software which configures routing of voice communication sessions to the plurality of telecommunications devices.*

*125. The apparatus of claim 121, wherein the plurality of wireless telecommunications devices comprise at least one telephone handset.*

*126. An apparatus for routing digital data signals among a plurality of telecommunication devices over a first network and a second network, the apparatus comprising:*

*a first network interface for wireless communications with the first network;*

*a discrimination circuit connected to the first network interface for detecting incoming voice digital data transmissions from among other data transmissions;*

*a second network interface, wherein the second network interface communicates digital data signals between a plurality of wireless telecommunications devices over the second network; and*

*a processor for executing instructions for routing the digital data signals between the first network interface, the second network interface and the plurality of wireless telecommunications devices for communication over the first and second networks, wherein the plurality of wireless telecommunications devices comprise at least one telephone handset.*

*127. The apparatus of claim 126, wherein the processor is further operative to execute instructions to:*

*process a plurality of digital communication sessions; and*

*distinguish each of the plurality of digital communication sessions using data transmission codes.*

*128. The apparatus of claim 126 further comprising a circuit for routing voice communication sessions to specific telecommunications devices, wherein the specific telecommunications devices are specified by configuration software.*

*129. The apparatus of claim 126 further comprising configuration software which configures routing of voice communication sessions to the plurality of telecommunications devices.*

*130. The apparatus of claim 126, wherein the first network comprises a cellular network.*

*131. An apparatus for routing digital data signals among a plurality of telecommunications devices over a network, the apparatus comprising:*

*a first assembly comprising a processor;*

*a first wireless interface (RU) connected to the first assembly for communicating digital data signals;*

*a second assembly comprising a network interface for connecting a communication line, wherein the network interface receives the digital data signals from the network communication line;*

*a second wireless interface (CLCU) connected to the second assembly for communicating the digital data signals to the first wireless interface;*

*a discrimination circuit connected to at least one of the first assembly and the second assembly for detecting incoming voice digital data signals from among other data signals;*

*a third wireless interface connected to the first assembly for communicating the digital data signals between a plurality of wireless telecommunications devices, wherein the processor executes instructions for routing the digital data signals between the first wireless interface, the second wireless interface, the third wireless interface, and the plurality of wireless telecommunications devices for communications over the network, wherein the plurality of wireless telecommunications devices comprise at least one telephone handset.*

*132. The apparatus of claim 131, wherein the processor is further operative to execute instructions to:*

*process a plurality of digital communication sessions; and distinguish each of the plurality of digital communication sessions using data transmission codes.*

*133. The apparatus of claim 131 further comprising a circuit for routing voice communication sessions to specific telecommunications devices, wherein the specific telecommunications devices are specified by configuration software.*

*134. The apparatus of claim 131 further comprising configuration software which configures routing of voice communication sessions to the plurality of telecommunications devices.*

*135. The apparatus of claim 131, wherein the network communication line is part of an Ethernet network.*

*136. The apparatus of claim 131, wherein the network communication line is part of a local area network.*

*137. The apparatus of claim 131, wherein the network communication line is part of a Cable network.*

*138. The apparatus of claim 131, wherein the network communication line is part of a digital subscriber line network.*

*139. The apparatus of claim 131, wherein the network communication line is part of a fiber optic network.*

* * * * *

UNITED STATES PATENT AND TRADEMARK OFFICE

CERTIFICATE OF CORRECTION

PATENT NO. : RE42,714 E
APPLICATION NO. : 10/962388
DATED : September 20, 2011
INVENTOR(S) : Phillip M. DeLaine, Jr.

It is certified that error appears in the above-identified patent and that said Letters Patent is hereby corrected as shown below:

Col. 10, line 41: “45” should read -- 44 --

Col. 10, line 44: “45” should read -- 44 --

Col. 10, line 46: “45” should read -- 44 --

Col. 10, line 48: “45” should read -- 44 --

Col. 10, line 50: “45” should read -- 44 --

Col. 10, line 53: “45” should read -- 44 --

Col. 10, line 55: “45” should read -- 44 --

Signed and Sealed this
Twenty-second Day of November, 2011

David J. Kappos

David J. Kappos
*Director of the United States Patent and Trademark Office*